(12) United States Patent
Petit

(10) Patent No.: US 12,182,011 B2
(45) Date of Patent: Dec. 31, 2024

(54) PARALLEL PROGRAM CONTROL SYSTEM AND METHOD

(71) Applicant: Arm Limited, Cambridge (GB)

(72) Inventor: Kévin Petit, Great Wilbraham (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/162,491

(22) Filed: Jan. 31, 2023

(65) Prior Publication Data

US 2024/0256436 A1 Aug. 1, 2024

(51) Int. Cl.
*G06F 12/02* (2006.01)
*G06F 9/48* (2006.01)

(52) U.S. Cl.
CPC .......... *G06F 12/023* (2013.01); *G06F 9/4881* (2013.01); *G06F 2212/251* (2013.01)

(58) Field of Classification Search
CPC .................. G06F 12/023; G06F 9/4881; G06F 2212/251
See application file for complete search history.

(56) References Cited

U.S. PATENT DOCUMENTS

| | | | |
|---|---|---|---|
| 10,068,366 B2 * | 9/2018 | Hakura | .............. H04N 13/00 |
| 2014/0229953 A1 * | 8/2014 | Sevastiyanov | ........ G06F 9/4881 |
| | | | 718/102 |

* cited by examiner

*Primary Examiner* — Edward J Dudek, Jr.
(74) *Attorney, Agent, or Firm* — Berkeley Law & Technology Group, LLP

(57) ABSTRACT

A system, method and computer program product configured to control a plurality of parallel programs operating in an n-dimensional hierarchical iteration space over an n-dimensional data space, comprising: a processor and a memory configured to accommodate the plurality of parallel programs and the data space; a memory access control decoder configured to decode memory location references to regions of the n-dimensional data space from indices in the plurality of parallel programs; and an execution orchestrator responsive to the memory access control decoder and configured to sequence regions of the n-dimensional hierarchical iteration space of the plurality of parallel programs to honour a data requirement of at least a first of the plurality of parallel programs having a data dependency on at least a second of the plurality of parallel programs.

17 Claims, 2 Drawing Sheets

System 100

Method 200

PARALLEL PROGRAM CONTROL SYSTEM AND METHOD

Figure 1:
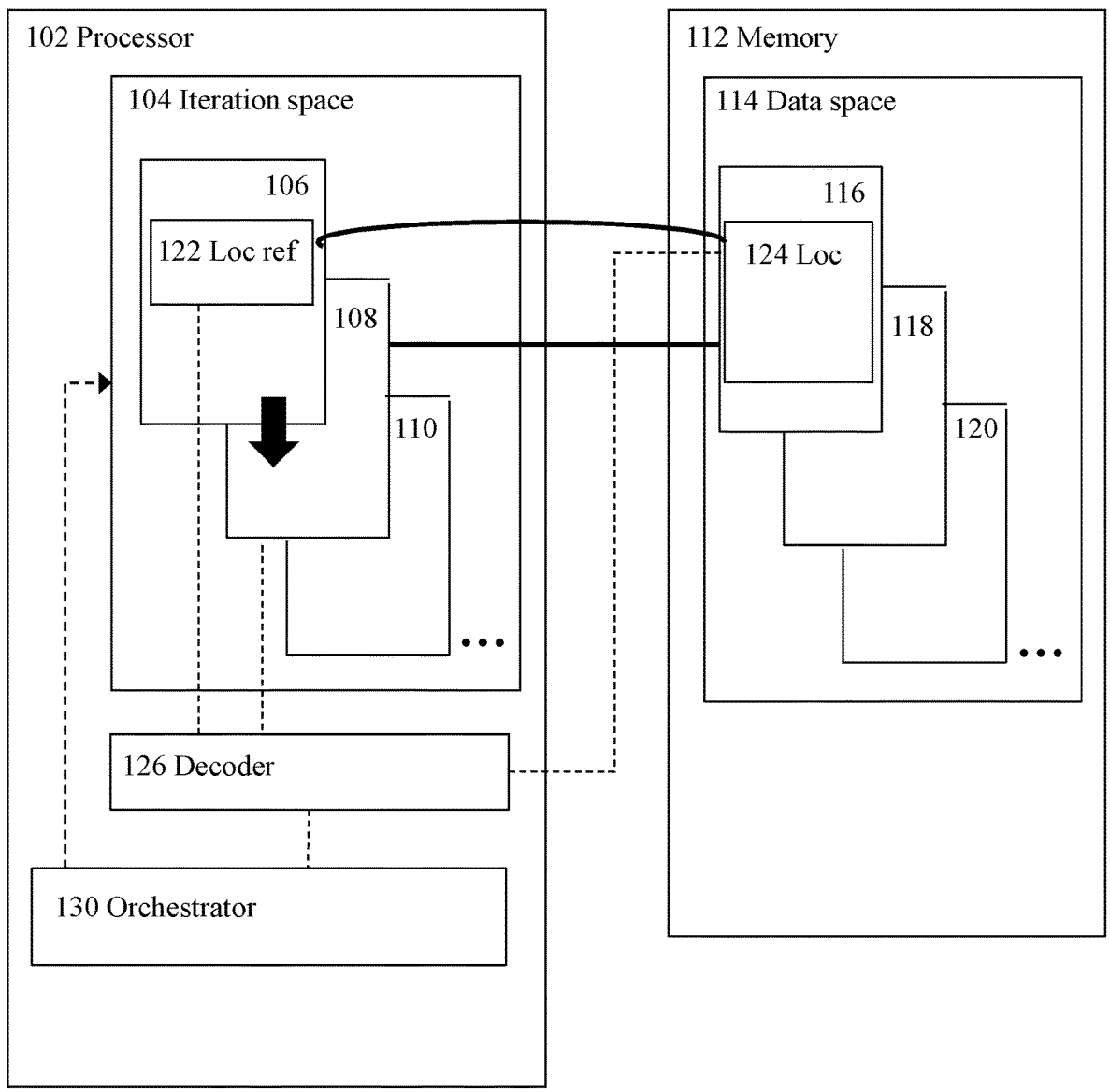

The present technology relates to the control of parallel programs, and especially to the control of parallel programs using a single instruction, multiple thread (SIMT) architecture to execute plural programs in an n-dimensional hierarchical iteration space over data in an n-dimensional data space.

In a SIMT architecture, each thread in the n-dimensional hierarchical iteration space runs the same code instructions, and each thread has access to at least one identified location in the n-dimensional data space. The threads are thus performing the same actions, in parallel, on their assigned portions of data.

In a typical SIMT environment, the n-dimensional hierarchical iteration space accommodates the processing threads that contain references to the relevant locations in the n-dimensional data space so that the processing threads can access and use the relevant data elements. For example, in a graphics processing environment, processing threads in shader cores act on vertex and attribute data to process graphical data for rendering. In a typical machine learning environment, such as a neural network, the execution units act on data in the form of tensors to perform learning and inferencing.

These environments involve massively parallel processing of extremely large data sets, and it is thus difficult to implement them within the constraints of available processing and memory provision. Any way of reducing the processing and data footprint of such systems is thus advantageous.

In a first approach to the many difficulties encountered in controlling plural parallel programs operating in n-dimensional hierarchical iteration spaces over n-dimensional data spaces, the present technology provides a system configured to control a plurality of parallel programs operating in an n-dimensional hierarchical iteration space over an n-dimensional data space, comprising: a processor and a memory configured to accommodate the plurality of parallel programs and the data space; a memory access control decoder configured to decode memory location references to regions of the n-dimensional data space from indices in the plurality of parallel programs; and an execution orchestrator responsive to the memory access control decoder and configured to sequence regions of the n-dimensional hierarchical iteration space of the plurality of parallel programs to honour a data requirement of at least a first of the plurality of parallel programs having a data dependency on at least a second of the plurality of parallel programs.

In a further implementation, there may be provided a method of controlling a plurality of parallel programs operating in an n-dimensional hierarchical iteration space over an n-dimensional data space. The method may be implemented in computer program form and embodied in non-transitory form in a computer program product.

Figure 2:
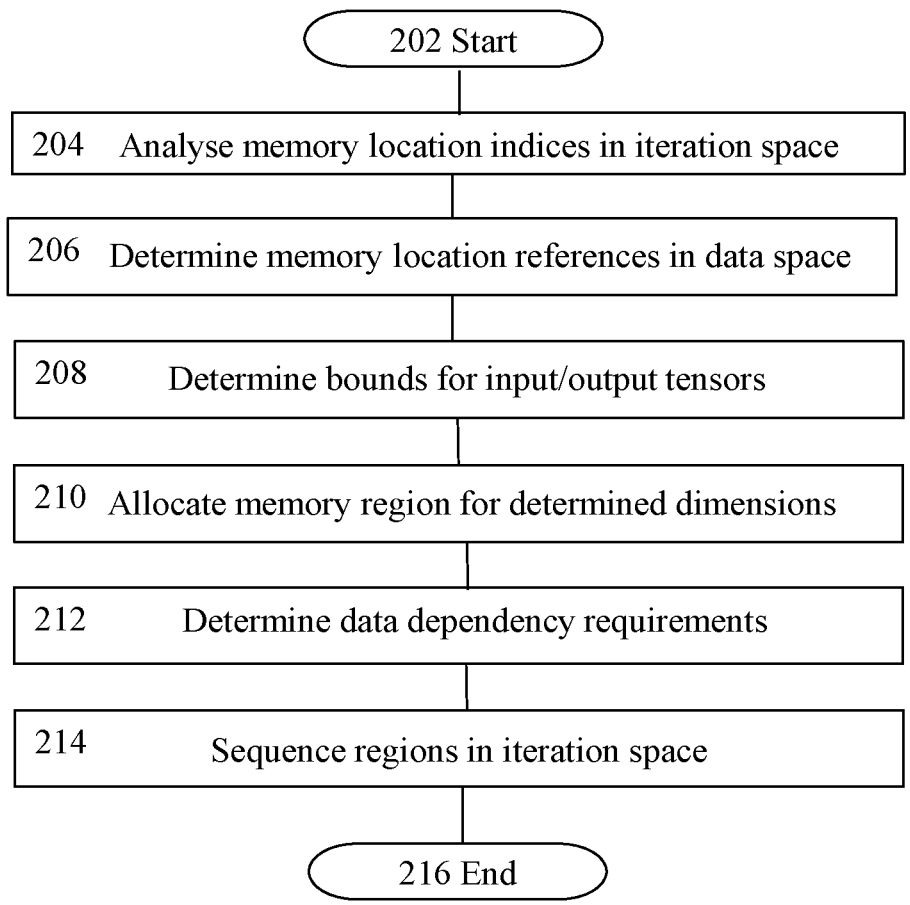

Implementations of the disclosed technology will now be described, by way of example only, with reference to the accompanying drawings, in which:

FIG. 1 shows a simplified view of a system for controlling a plurality of parallel programs operating in an n-dimensional hierarchical iteration space over an n-dimensional data space according to an implementation of the presently described technology; and FIG. 2 shows a much simplified example of a method of operation of a system for controlling a plurality of parallel programs operating in an n-dimensional hierarchical iteration space over an n-dimensional data space according to an implementation of the presently described technology.

The present technology thus provides implementations in the form of a system, a method and a computer program for efficiently controlling plural parallel programs or threads operating over multi-dimensional data spaces—the increased efficiency in program executable code and data memory footprint and execution power expenditure will be clear to one of ordinary skill in the art.

In the present disclosure, "parallel programs" are programs that comprise one or more elements, such as threads comprising instructions, that may be processed at the same time by hardware processing elements. "Iteration space" refers to the abstract space within which instances of parallel program threads operate. "Memory location" refers to an identifier used to specify a point or bounding entity within a data space, and "memory location reference" refers to a reference to that identifier as it is used as an index into a data space to access data for use by a program. "Data dependency" refers to any situation in which a first program is reliant upon a second program to have caused an effect upon some data, an effect which the first program relies on when it subsequently accesses that data—in a very simple example, it may be that a first program relies upon a value being converted by a second program from one form of data representation into another (as from an ASCII character form to a binary numeric form suitable for performing calculations) before it can be further processed by the first program.

Massively parallel data processing systems (e.g. GPUs) that implement a SIMT architecture typically use an N-dimensional hierarchical iteration space to describe and identify the threads involved in a given computation (i.e. instance of a program). Such a space is often further subdivided into so-called work groups and sub-groups. Those systems typically use multiple memory spaces or regions, with restrictions on what subdivisions, or regions, of the iteration space can access each one of them.

For example there can be a memory space that all threads can access but one that can only be accessed by threads that belong to the same work group. Those systems also typically access memory via resource abstractions that provide a view of memory alongside associated semantics. Multiple different types of such resources are typically used (e.g. buffers, images, and tensors). In those systems each thread in a program may typically access any location in the memory spaces it has access to and the execution environment for the program does not typically hold any information on the memory locations accessed by a given thread. This means the execution environment does not have much freedom in the way it can orchestrate the execution of parallel programs or collections thereof and typically will execute work groups independently but will have to execute individual programs in sequence when there exist data dependencies between several of the programs (e.g. producer/consumer relationships).

When an execution environment is instructed to run a collection of programs that exhibit data dependencies in a producer/consumer fashion, it can be advantageous for performance to fuse several of them into a single machine program to avoid the need to write data back to memory between execution of a producer and a consumer and thereby reduce memory traffic and memory footprint as well as power consumption. Performing such fusion requires a detailed understanding of the data dependencies between programs and how they relate to the iteration space.

It further requires detailed understanding of the data size requirements of the entire input-process-output flow—so that sufficient memory can be allocated for use according to inherent size of the input data and the data size effects of the operations to be performed by the programs.

The present technology provides a system, method and computer program for controlling a plurality of parallel programs operating in an n-dimensional hierarchical iteration space over an n-dimensional data space, comprising a processor and a memory configured to accommodate the plurality of parallel programs and the data space. A memory access control decoder is configured to decode memory location references to regions of the n-dimensional data space from indices in the plurality of parallel programs. An execution orchestrator is then responsive to the memory access control decoder and configured to sequence regions of the n-dimensional hierarchical iteration space of the plurality of parallel programs to honour a data requirement of at least a first of the plurality of parallel programs having a data dependency on at least a second of the plurality of parallel programs. In doing so, the execution orchestrator can be configured to honour a contract to restrict a program's memory access to a specific region. When the execution orchestrator sequences the regions in the iteration space, it can fuse together programs that have data dependencies into a single execution entity, or it can tile or cascade programs to take advantage of memory handling optimizations. In order to do these things, it must determine the bounds of the data entities in the data space, for example by predicting the likely size of an output tensor from an input tensor when it is subjected to certain transform operations by the programs in the iteration space.

Honouring the dependency thus relies upon an accurate definition of the memory requirements to accommodate the data for the programs—for example, where an input tensor size can be accurately known, but the output size must be ascertained by calculation from the input size and the effects of operations performed by the program on in-process data and on the eventual output data. Each operation, such as convolution, deconvolution, matrix arithmetic operations and the like will have an impact on the size of memory that will be required in the input-process-output flow.

Implementations of the present technology address the problems posed by intensive parallel processing of data in multidimensional data spaces by providing a precise bounding or exact description of the memory locations accessed in each space and for each resource directly in representations for parallel programs that an execution environment can rely on as a contract between the program and its environment. These contracts could in theory be provided by programmers using specific new constructs in high-level parallel languages, but, more advantageously, they can be provided by way of analysis on representations of the programs at various levels (for example as abstract syntax trees, or as high/mid/low-level intermediate representations).

In cases where automated analysis is used, some implementations of the present technology make it possible to instrument the programs to perform that analysis outside of the execution environment, for example in a separately-managed execution environment, where added complexity and execution time are generally less of a constraint.

Whichever technique is used to determine the contract, when an execution environment is assured that it can trust that a given thread in the program will never access memory outside of the contractual bounds that have been determined for a given resource, that execution environment has the freedom to better orchestrate the execution of one or more of the parallel programs. For example, it could tile or cascade the execution of multiple programs to reduce the peak memory footprint of executing a particular computational graph or it could take advantage of temporal locality in caches to reduce memory access bandwidth.

Turning to FIG. 1, there is shown a much-simplified representation of a system 100 comprising a processor 102 that is configured to accommodate a plurality of parallel programs/threads 106, 108, 110 . . . in an n-dimensional iteration space 104. Processor 102 may comprise any form of data processing unit or configuration of units—for example, a central processing unit, a graphics processing unit, or any multiprocessor or distributed processor arrangement. Processor 102 is arranged in electronic communication with memory 112, which is configured to contain and provide access to data for programs (such as programs 106, 108, 110 . . . ), and which may, for example, comprise a random access memory, which in turn may be backed by any form of backing store. Memory 112 is configured to accommodate data space 114, which is an n-dimensional data space comprising regions 116, 118, 120 . . . . It will be clear to one of skill in the art that the n-dimensions of iteration space 104 and the n dimensions of data space 114 are wholly independent—the number and size of threads in iteration space 104 and the number and size of, for example, tensors in data space 114 do not depend one upon another.

As will be clear to one of skill in the art, the representation in FIG. 1 of the n dimensions in iteration space 102 an the n dimensions in data space 114 is much simplified, and in any real-world implementation, it is likely that many more dimensions would exist. For example, data in the form of tensors for use by execution units of a neural network may be of much higher dimensions.

In the simplified representation of FIG. 1, the program shown at 106 comprises a location reference 122 to a location 124 in region 116 of data space 114. The relationship between the location reference 122 and the location 124 is indicated in FIG. 1 by the heavy curved line connecting location reference 122 and location 124. Program 106 may be, for example, a consumer of some data located at location 124 in region 116 of data space 114. The program shown at 108 also has a relationship (indicated in FIG. 1 by the heavy straight line connecting program 108 and region 116 in data space 114) with region 116 of data space 114. It may, for example, be a producer of some data located at location 124 in region 116 of data space 114, or it may enact some instructions that otherwise directly or indirectly affect the data at location 124. If there is a need for the data consumed by program 106 to be data that has been previously produced or otherwise affected by program 108—in a simple example, if program 108 translates data from one form into another, where the first form is unsuitable for consumption by program 106 and the second form is suitable for consumption by program 106—there is created a data dependency from program 106 to program 108, shown in FIG. 1 by the heavy black arrow. As is well known to those of skill in the art, data dependencies in parallel processing systems may pose significant problems. In the worst case scenario, the system may need to be completely redesigned to "de-parallelize" the programs or to place controls, possibly of the spin-lock type, on the data. Either of these two approaches reduces or nullifies the advantages of parallel programming.

As is also well known to those of skill in the art, the execution environment within which programs manipulate data may be constrained so that the sizes of stored code and data may be critical. For example, in many embedded systems the memory available for storage of tensors during the input-process-output path may be severely limited. In such circumstances, it is advantageous to orchestrate programs such that no untoward memory availability conditions are encountered.

Memory contracts enable the calculation of appropriate tensor sizes starting with the input size. Memory contracts according to the present technology are able to determine dimensions of sufficient size. For example, if is is necessary to cascade two operators on a tensor horizontal slice, there must be an available output buffer of a sufficient size available. These data size considerations are central to the operation of an execution orchestrator according to the present technology.

In one aspect, the present technology provides for the calculation of appropriate maximum tensor sizes given a limit on available memory. This is of course critically important in embedded systems but is also relevant for cascading. For example, a maxpool 2×2 operator reduces the size of the output tensor by 2 in two dimensions. Cascading two maxpool operators would need an input tensor of at least 4×4 to make sense. Convolution with a VALID size parameter has a similar issue.

This means that the input and output sizes where known or calculated must be factored into any orchestration of program activity. This is also important if the last operation in a sequence relies on hardware that requires a specific size (for example matrix multiplication or vectorized operations). This type of requirement is inherent in execution units such as shaders, and may thus put limits on what size of tensor can be supported efficiently.

In implementations of the present technology, there is provided a decoder 126 configured in electronic communication with iteration space 104 and data space 114 to decode memory location references, for example, location reference 122, from indices in program 106 and program 108 as both relating to location 124 in region 116 of data space 114. Decoder 126 in effect determines a contractual bond between program 106 and program 108 with reference to region 116 and makes the contract based on the decoded information available to orchestrator 130. The contract may for example, restrict a program's memory access to a specific region.

Decoder 126 may be configured to decode a relationship between a memory location 124 in the data space 114 and an index in one of the plurality of parallel programs 106, 108, 110, . . . wherein the relationship may be constructed in the intermediate representation of the program as a symbolic expression in single static assignment (SSA) form. The method applied here may use so-called symbolic expressions in SSA form that relate the values used to describe indices within the iteration space and locations in memory spaces for the various resources. This method is a superset of so called affine or semi-affine transforms that can be generated therefrom.

In one implementation, the decoder 126 is configured to decode memory location references of a partially specified tensor to determine dimensions in memory of sufficient size to accommodate the tensor and at least one affine transform of the tensor, so that the contract can define specific upper and lower bounds for the tensor and allocate (or have allocated) a memory region 116, 118, 120, . . . of the correct dimensions. At a high level of abstraction, this method can be seen as a way to perform shape inference on a computational graph comprising a plurality of compute programs. Taking the example of a program that consumes one tensor and produces one tensor, it is possible from the size of the input tensor consumed by a program to calculate the size of an iteration space that would make full use of the data in that tensor and subsequently the size of the output tensor. Such inference calculations can be chained an arbitrary number of times and enable computational graphs to be described without the need to fully specify the size of the resources they use.

There will now be described a worked example for memory contracts that could be used with a parallel program implementing a 2D max-pooling operation with a kernel size of [2,2] and a stride of [2,2] on 4D tensors using a 3D iteration space.

To simplify, it is assumed that each thread in the iteration space for the program produces a single element of the output tensor. As would be clear to one of skill in the art, a real-world implementation would produce multiple elements for performance reasons. It is also assumed for the example that the size of the tensors along their outermost dimension is 1 for simplicity (so that there is no need to fold dimensions).

The example shows differing dimensionalities between the resources accessed and the iteration space as well as the use of constant bounds in contracts whilst keeping the example relatively simple, thus:

$$\text{Input Tensor} \rightarrow \text{Parallel Program} \rightarrow \text{Output Tensor}$$

The grammar for the example pseudo-code follows these conventions:

$$\text{TENSOR\_CONTRACT} := [\text{LOWER\_BOUND\_X0, UPPER\_BOUND\_X0}]$$
$$[\text{LOWER\_BOUND\_X1, UPPER\_BOUND\_X1}]$$
$$\ldots$$
$$[\text{LOWER\_BOUND\_Xn, UPPER\_BOUND\_Xn}]$$
$$\text{ITERATION} := [X0, X1, \ldots, Xn] //\text{iteration space vector}$$
$$\text{TENSOR\_COORDINATES} := [T0, T1, T2, T3]$$

Each of the [LOWER_BOUND, UPPER_BOUND] vectors defines one of the dimensions for a bounding box encompassing all the accesses that are allowed by the contract. The values are expressed in the tensor coordinate space.

The contract for the output tensor is very simple:

$$\text{TENSOR\_CONTRACT} := [0, 0]$$
$$[\text{ITERATION}.X0, \text{ITERATION}.X0]$$
$$[\text{ITERATION}.X1, \text{ITERATION}.X1]$$
$$[\text{ITERATION}.X2, \text{ITERATION}.X2]$$

The first coordinate is always 0 (the size of the tensor along its outermost dimension is 1). Each thread in the iteration space accesses a single element in the output tensor and the bounding box along each dimension starts and ends at the same coordinates.

The contract for the input tensor is as follows:

$h\_low = ITERATION.X0 * 2$ $h\_high = ITERATION.X0 * 2 + 1$ $w\_low = ITERATION.X1 * 2$ $w\_high = ITERATION.X1 * 2 + 1$ TENSOR_CONTRACT := [0, 0]
[h_low, h_high]
[w_low, w_high]
[ITERATION.X2, ITERATION.X2]

Each of the threads accesses a window of size two elements along both the T1 and T2 dimensions for a total of 4 elements accessed by each thread. The first coordinate is computed by applying a dilation factor of two on the iteration space because:
1. The operation has a stride size of 2.
2. It is known that the iteration space is mapped 1:1 to the coordinate space of the output tensor.

(This is operation-dependent behaviour and not a general rule for the contracts).

In this case the contract for the input tensor and output tensor fully cover the tensors and no out-of-bounds accesses occur so it is possible to use both contracts to infer the shape of one tensor from the other as follows. For forward projection, it is necessary to:
1. Back-project, where back projection requires inverting the bound expressions, the input tensor size (in tensor coordinates) to the iteration space.
2. Project the iteration space to the output tensor coordinate space.

For an input tensor of size [1, 16, 16, 16], the process is as follows. The bound expressions for the first coordinate in the contract is a constant (i.e. is independent of the iteration space) and those for the last coordinate map to the iteration space directly, so it can be trivially deduced that the iteration space size must be of the form: [Ix, Iy, 16]. To find Ix and Iy, the process must invert the bound expressions (treated here as simple algebraic expressions for simplicity, but in the real-world this would be more complicated, where 2's complement arithmetic on fixed size integers is used and concerns would arise about defined-ness, overflow, underflow, etc):

$ITERATION.XO\_low = h\_low/2$ $ITERATION.XO\_high = (h\_high - 1)/2$

The tensor has a size of 16 along the T1 dimension so coordinates [h_low, h_high] lie in the range [0,15], which gives:

$ITERATION.XO\_low = 0/2 = 0$ $ITERATION.XO\_high = (15 - 1)/2 = 7$

Applying a similar reasoning to ITERATION.X1, it can be deduced that the iteration space has a size of [8,8,16] and thus our output tensor has a size of [1, 8, 8, 16] (because each of its coordinate trivially maps to one thread in the iteration space).

For backwards projection, the process works as follows:
1. Back-project the output tensor size (in tensor coordinates) to the iteration space.
2. Project the iteration space to the output tensor coordinate space.

For partial projection, the above method can be used to discover size constraints by applying projections on tensor sizes that are a combination of concrete and symbolic sizes, e.g. a tensor whose size would be [1, H, W, 16]. The resulting inferred size would be expressed in terms of H and W.

In this way, the present technology provides a method to relate the elements of an input tensor to the affected elements of the output tensors. This extends dependency analysis which works out dependencies, to having a mathematical equation giving the exact relation of un-dimensioned tensors. The present technology may use affine expressions that relate how each of the output tensor elements relates to one or all of the input tensors. As a simple example, the calculation would look like this for a 2×2 maxpool operator:

$out[y, x] =$ $in[y * 2 \ldots y * 2 + 1, x * 2 \ldots x * 2 + 1]$(note the range operators)

This would allow calculation of not only the bounding box given a tensor size, but also, given a partially specified input or output tensor size, calculation of missing dimensions and thus estimation of a suitable tensor size given memory constraints. In instances where one dimension is left unspecified, for example, when a tensor is sliced for the purpose of cascading, when it may be sliced horizontally, the present technology can compute the resulting size in the vertical direction when the execution orchestrator is given the sequence of operations to be performed in the program.

In implementations of this technique of using memory contracts, a bounding box may be calculated for the region of an output tensor that is written to by a program, given one or more input tensors. This output region is specified as a bounding box with a lower bound and an upper bound for each tensor dimension. When generating an execution unit, such as a shader, the intermediate representation may be analyzed and bounding box derived, using affine expressions as the intermediate step. These expressions are resolved when a compute graph is constructed so the graph compiler can perform optimizations such as tiling and cascading, as described above.

Orchestrator 130 is thus responsive to the contract provided by decoder 126 and is configured at least to sequence regions of the iteration space 104, such that contracts relating to data dependencies can be honoured. Orchestrator 130 thus, in effect, determines the execution-time relative locations of data in data space 114, predicting bounds for partially-specified data regions, and then controls execution of the programs in the iteration space to ensure that data within those bounds can be used without breaking any data dependencies.

Turning now to FIG. 2, there is shown a much simplified example of a method 200 of operation of a system for controlling a plurality of parallel programs operating in an n-dimensional hierarchical iteration space over an n-dimensional data space according to an implementation of the presently described technology.

Method 200 begins at Start 202, and at 204, the decoder analyses memory location indices in the iteration space. At

206, the decoder determines the corresponding memory location references in the data space. At 208, bounds for input and output tensors are determined (for example, by applying affine transforms where tensors are partially-specified), and at 210, appropriate memory regions in the data space are allocated according to the determined dimensions. The necessary sizes of memory regions required may also be affected by the need for working memory space during the processing of the data. The decoder determines any data dependencies between program regions in the iteration space, where these may also for example be expressed as part of the memory contract. At 214, the orchestrator acts in response to the data size and dependency information supplied by the decoder to at least sequence the regions in the iteration space. The sequencing may take the form of, for example, tiling or cascading, or it may take the form of fusing programs into single execution units. At 216, the method completes. As will be clear to one of skill in the art, the completion at 216 may represent an end to processing, or the process may be iterative, in which case the method begins again at Start 202 with further input parameters and context.

Thus, broadly, the present technology provides various implementations of a system for controlling a plurality of parallel programs operating in an n-dimensional hierarchical iteration space over an n-dimensional data space, comprising a processor and a memory configured to accommodate the plurality of parallel programs and the data space; a memory access control decoder configured to decode memory location references to regions of the n-dimensional data space from indices in the plurality of parallel programs; and an execution orchestrator responsive to the memory access control decoder and configured to sequence regions of the n-dimensional hierarchical iteration space of the plurality of parallel programs to honour a data requirement of at least a first of the plurality of parallel programs having a data dependency on at least a second of the plurality of parallel programs. The data requirement may comprise, for example, a contract to restrict a program's memory access to a specific region.

The memory access control decoder may be configured to decode a relationship between a memory location in the data space and an index in one of the plurality of parallel programs, wherein the relationship may, for example, be constructed in an intermediate representation as a symbolic expression in single static assignment (SSA) form.

The memory access control decoder may be configured to decode memory location references of a partially specified tensor to determine dimensions in memory of sufficient size to accommodate the tensor and at least one affine transform of the tensor. The execution orchestrator can then, responsive to the memory access control decoder, allocate a memory region of the determined dimensions. The execution orchestrator sequencing the regions may include, for example, fusing together programs having a data dependency into a single execution entity, or tiling execution of the first and the second programs. As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product embodied in a non-transitory computer readable medium having computer readable program code embodied thereon. The computer readable medium may be a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

What is claimed is:

1. A system configured to control a plurality of parallel programs operating in an n-dimensional hierarchical iteration space over an n-dimensional data space, comprising:

a processor and a memory configured to accommodate the plurality of parallel programs and the n-dimensional data space;

a memory access control decoder configured to decode memory location references to regions of the n-dimensional data space from indices in the plurality of parallel programs; and an execution orchestrator responsive to the memory access control decoder and configured to sequence regions of the n-dimensional hierarchical iteration space of the plurality of parallel programs to honour a data requirement of at least a first of the plurality of parallel programs having a data dependency on at least a second of the plurality of parallel programs, wherein the memory access control decoder is further configured to decode memory location references of a partially specified tensor to determine dimensions in memory of sufficient size to accommodate the partially specified tensor and at least one affine transform of the partially specified tensor.

2. The system according to claim 1, wherein the data requirement comprises a contract to restrict a program's memory access to a specific region.

3. The system according to claim 1, wherein the execution orchestrator is responsive to the memory access control decoder to allocate a memory region of the determined dimensions.

4. The system according to claim 1, wherein the execution orchestrator sequencing the regions comprises fusing together programs having a data dependency into a single execution entity.

5. The system according to claim 1, wherein the execution orchestrator sequencing the regions comprises tiling execution of the first plurality of the parallel programs and the second of the plurality of parallel programs.

6. The system according to claim 1, wherein the memory access control decoder is configured to decode a relationship between a memory location in the n-dimensional data space and an index in one of the plurality of parallel programs.

7. The system according to claim 1, wherein the parallel programs comprise single instruction multiple thread programs.

8. A method of operating a controller to control a plurality of parallel programs operating in an n-dimensional hierarchical iteration space over an n-dimensional data space, comprising:

decoding memory location references to regions of the n-dimensional data space from indices in the plurality of parallel programs;

sequencing regions of the n-dimensional hierarchical iteration space of the plurality of parallel programs to honour a data requirement of at least a first of the plurality of parallel programs having a data dependency on at least a second of the plurality of parallel programs; and decoding memory location references of a partially specified tensor to determine dimensions in memory of sufficient size to accommodate the partially specified tensor and at least one affine transform of the partially specified tensor.

9. The method according to claim 8, wherein honouring the data requirement comprises honouring a contract to restrict a program's memory access to a specific region.

10. The method according to claim 8, further comprising allocating a memory region of the determined dimensions.

11. The method according to claim 8, wherein sequencing the regions comprises fusing together programs having a data dependency into a single execution entity.

12. The method according to claim 8, wherein sequencing the regions comprises tiling execution of the first of the plurality of parallel programs and the second of the plurality of parallel programs.

13. The method according to claim 8, further comprising decoding a relationship between a memory location in the n-dimensional data space and an index in one of the plurality of parallel programs.

14. A computer program product stored in a non-transitory computer readable medium and comprising computer readable program code to:

decode memory location references to regions of an n-dimensional data space from indices in a plurality of parallel programs; and sequence regions of an n-dimensional hierarchical iteration space of the plurality of parallel programs to honour a data requirement of at least a first of the plurality of parallel programs having a data dependency on at least a second of the plurality of parallel programs; further comprising decoding memory location references of a partially specified tensor to determine dimensions in memory of sufficient size to accommodate the partially specified tensor and at least one affine transform of the partially specified tensor.

15. The computer program product according to claim 14, wherein honouring the data requirement comprises honouring a contract to restrict a program's memory access to a specific region.

16. The computer program product according to claim 15, further comprising allocating a memory region of the determined dimensions.

17. The computer program product according to claim 14, further comprising decoding a relationship between a memory location in the n-dimensional data space and an index in one of the plurality of parallel programs.

* * * * *